United States Patent
Hammer et al.

(10) Patent No.: US 10,072,688 B2
(45) Date of Patent: Sep. 11, 2018

(54) CLIP CONNECTION AND CLIP ELEMENT

(71) Applicant: Bayerische Motoren Werke Aktiengesellschaft, Munich (DE)

(72) Inventors: Maik Hammer, Bruckberg (DE); Johann Van Niekerk, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 316 days.

(21) Appl. No.: 14/990,903

(22) Filed: Jan. 8, 2016

(65) Prior Publication Data

US 2016/0123363 A1 May 5, 2016

Related U.S. Application Data

(63) Continuation of application No. PCT/EP2014/067380, filed on Aug. 14, 2014.

(30) Foreign Application Priority Data

Sep. 18, 2013 (DE) .................... 10 2013 218 649

(51) Int. Cl.
*F16B 5/06* (2006.01)
*F16B 21/07* (2006.01)

(52) U.S. Cl.
CPC .......... *F16B 5/0664* (2013.01); *F16B 5/0642* (2013.01); *F16B 21/073* (2013.01)

(58) Field of Classification Search
CPC .. B60R 13/0206; F16B 5/0664; F16B 5/0642; F16B 21/073
USPC .................................... 292/341.15
See application file for complete search history.

(56) References Cited

U.S. PATENT DOCUMENTS

| | | | |
|---|---|---|---|
| 5,580,204 | A | 12/1996 | Hultman |
| 2011/0247172 | A1 | 10/2011 | Yoshii et al. |
| 2012/0110793 | A1* | 5/2012 | Watanabe ........... B60R 13/0206 24/289 |
| 2012/0251226 | A1 | 10/2012 | Liu et al. |

(Continued)

FOREIGN PATENT DOCUMENTS

| | | |
|---|---|---|
| CN | 102128193 A | 7/2011 |
| CN | 102257580 A | 11/2011 |
| DE | 32 32 926 A1 | 3/1984 |

(Continued)

OTHER PUBLICATIONS

Chinese Office Action issued in counterpart Chinese Application No. 201480040778.3 dated Aug. 30, 2016, with English translation (eighteen (18) pages).

(Continued)

*Primary Examiner* — Jack W Lavinder
(74) *Attorney, Agent, or Firm* — Crowell & Moring LLP

(57) ABSTRACT

A clip connection includes a first component, a male fixing element protruding from the first component, the male fixing element having a first portion connected directly to the first component and a second spherical portion adjoining the first portion, and a clip element that is clipped onto the male fixing element. The clip element has a plurality of clamping jaws spaced apart from one another in a circumferential direction of the clip element. The plurality of clamping jaws bear against the spherical portion from below beneath an equatorial plane of the second spherical portion.

18 Claims, 2 Drawing Sheets

(56) References Cited

U.S. PATENT DOCUMENTS

2013/0031756 A1* 2/2013 Yuen ................ F16B 5/0642
    24/702
2015/0033532 A1 2/2015 Van Niekerk et al.

FOREIGN PATENT DOCUMENTS

| | | |
|---|---|---|
| DE | 201 08 408 U1 | 10/2001 |
| DE | 10 2012 206 938 B3 | 2/2013 |
| EP | 0 584 517 A1 | 3/1994 |
| EP | 1 496 270 A2 | 1/2005 |
| GB | 2 082 668 A | 3/1982 |
| GB | 2 375 569 A | 11/2002 |

OTHER PUBLICATIONS

Chinese Office Action issued in counterpart Chinese Application No. 201480040778.3 dated Mar. 20, 2017 with English-language translation (sixteen (16) pages).
International Search Report (PCT/ISA/210) issued in PCT Application No. PCT/EP2014/067380 dated Nov. 27, 2014, with English translation (six (6) pages).
German Office Action issued in counterpart German Application No. 10 2013 218 649.5 dated Jul. 23, 2014 (three (3) pages).
Chinese-language Office Action issued in counterpart Chinese Application No. 201480040778.3 dated Sep. 20, 2017 with English translation (Five (5) pages).

\* cited by examiner

CLIP CONNECTION AND CLIP ELEMENT

CROSS REFERENCE TO RELATED APPLICATIONS

This application is a continuation of PCT International Application No. PCT/EP2014/067380, filed Aug. 14, 2014, which claims priority under 35 U.S.C. § 119 from German Patent Application No. 10 2013 218 649.5, filed Sep. 18, 2013, the entire disclosures of which are herein expressly incorporated by reference.

This application contains subject matter related to U.S. application Ser. No. 14/990,896, entitled "Fastening Claw" filed on Jan. 8, 2016.

BACKGROUND AND SUMMARY OF THE INVENTION

The present invention relates to a clip connection and a clip element for the clip connection.

Such a clip connection is known from DE 10 2012 206 938 B3.

It is the object of the invention to create a versatile clip connection which has a simple structure and exhibits a pull-off force which is great compared to the joining force, and a clip element suitable therefor.

This and other objects are achieved by a clip connection having a first component, a male fixing element which protrudes from the first component, and a clip element which is clipped onto the male fixing element. The male fixing element has a first portion connected directly to the first component and a second, spherical or sphere-like portion adjoining the first portion. The clip element has a plurality of clamping jaws spaced apart from one another in a circumferential direction of the clip element. The clamping jaws bear against the spherical or sphere-like portion from below beneath an equatorial plane of the spherical or sphere-like portion.

The starting point of the invention is a clip connection having a first component from which a "male fixing element" protrudes. The male fixing element can be subdivided into a first portion and a second portion connected to the first portion or adjoining the first portion.

Via the first portion, the male fixing element is directly connected to the first component. The male fixing element can be connected to the first component, for example, integrally via the first portion or be welded to the first component or be connected to the first component in some other way. The second portion adjoining the first portion has the form of a sphere or a sphere-like form.

The first portion can likewise have the form of a sphere or a sphere-like form. This does not absolutely have to be the case, however. The first portion could also be configured for example in a peg-like or cylindrical manner or the like. The second spherical or sphere-shaped portion protrudes preferably in the manner of a head from the first portion.

A clip element is clipped onto the male fixing element, in particular onto the spherical or sphere-like, head-like first portion thereof.

An aspect of the invention is that the clip element has a plurality of "clamping jaws" spaced apart from one another in a circumferential direction of the clip element. The clamping jaws bear against the spherical or sphere-like first portion obliquely from below beneath an "equatorial plane" of the spherical or sphere-like first portion.

The expression "equatorial plane" should be understood as meaning a plane which is perpendicular or substantially perpendicular to a straight line which extends through a midpoint of the spherical or sphere-like first portion and which is perpendicular or substantially perpendicular to a tangential plane of the first component at the point of contact of the male fixing element with the first component. In other words, the equatorial plane contains a greatest diameter of the spherical or sphere-like first portion.

Since the clamping jaws bear against the male fixing element beneath the equatorial plane of the spherical or sphere-like first portion, a form fit or an undercut of the clamping jaws of the clip element with respect to the male fixing element arises. The clamping jaws thus oppose a pull-off force acting on the clip element, said pull-off force attempting to pull the clip element off the male fixing element.

By use of such a clip element, very different components or parts connected to the clip element can be fastened to the male fixing element protruding from the first component.

Alternatively or in addition, provision can be made of a second component which has a through-hole through which the male fixing element protruding from the first component extends. The first portion of the male fixing element should preferably be at least so long that the spherical or sphere-like second portion of the male fixing element is located fully or virtually fully on that side of the second component that is remote from the first component. By way of the clip element, the first component and the second component can be clamped together or at least be connected loosely together, such that the clip element opposes any pulling of the second component off the male fixing element protruding from the first component.

According to one development of the invention, the clip element has a shield-like or hat-like portion which protrudes from a lower region of the clamping jaws, for example obliquely downward, i.e. in the direction of the first component. The shield-like or hat-like portion is thus comparable to the brim protruding obliquely downward from a middle part of a hat.

Inasmuch as the clip element is intended to fix a second component, provided with a through-hole, to the male fixing element protruding from the first component, provision can be made for at least the shield-ring-like or brim-like portion of the clip element to bear against the second component on a side, remote from the first component, of the second component in a region of the second component close to the through-hole. The shield-ring-like or hat-like portion of the clip element thus engages over the through-hole, with the result that the clip element opposes any pulling of the second component off the first component, or off the male fixing element protruding from the first component.

An essential advantage of the invention can be seen in the fact that a pull-off force acting on the second component is transferred to the shield-ring-like or hat-like portion of the clip element and is converted into a bending moment which presses the clamping jaws of the clip element against the spherical or sphere-like first portion of the male fixing element, resulting in self-locking that counteracts the pull-off movement.

According to one development of the invention, the individual clamping jaws of the clip element are arranged in a manner distributed evenly in the circumferential direction of the clip element and separated from one another by clamping-jaw slots. Provision can be made for the individual clamping jaws to be the same size, i.e. the individual clamping jaws each extend over same-size circumferential portions of the spherical or sphere-like first portion of the male fixing element.

According to one development of the invention, the clamping-jaw slots extend downward as far as the shield-ring-like or hat-like portion from a top side, remote from the shield-ring-like or hat-like portion, of the clamping jaws.

According to one development of the invention, the shield-ring-like or hat-like portion has shield-ring slots spaced apart from one another in the circumferential direction of the clip element, said shield-ring slots extending in a radial direction of the clip element. A respective shield-ring lobe is arranged between two shield-ring slots that follow one another in the circumferential direction.

According to one development of the invention, it is advantageous for the shield-ring slots to be arranged in an offset manner with respect to the clamping-jaw slots as seen in the circumferential direction of the clip element. As a result, a pull-off force acting on the shield-ring lobes is converted into a self-locking bending moment that presses the clamping jaws against the spherical or sphere-like first portion.

Provision can furthermore be made for each of the shield-ring lobes to extend in each case over half of a first clamping jaw and over half of a next or second clamping jaw that follows the first clamping jaw in the circumferential direction, as seen in the circumferential direction.

Tests have shown that it is advantageous for at least three clamping jaws and clamping-jaw slots to be provided. Clip elements which have four clamping jaws and four clamping-jaw slots appear to be particularly advantageous. Accordingly, it is advantageous for the clip element to have at least three, in particular exactly four, shield-ring slots and shield-ring lobes.

As already mentioned at the beginning, the invention is usable in very different fields of technology, for example vehicle body construction, furniture construction, the "white goods" sector, etc. Accordingly, the male fixing element can consist, for example, of metal, in particular of steel. In principle, the male fixing element can also consist of plastics material or of some other material, for example wood. The male fixing element can, as already mentioned, be connected integrally to the first component or be welded to the latter or be connected to the first component in some other way.

The clip element can be produced from plastics material, which has a degree of bending elasticity that is at least sufficient for the clip element to be able to be clipped onto the male fixing element with elastic deformation, wherein the shield-ring lobes and the clamping jaws can be pivoted flexibly to a certain extent. The clip element can be, in particular, an injection-molded part.

It should be emphasized that the features of the clip element that are described in connection with the clip connection are also attributable directly to the clip element itself.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
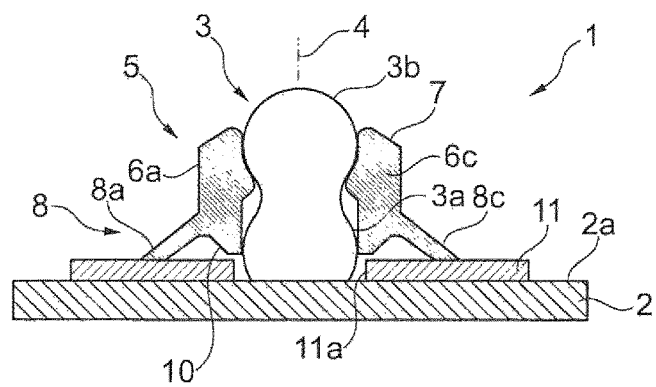
FIG. 1 illustrates two variants of a first exemplary embodiment according to the invention.

FIG. 1 shows a component connection 1 having a first component 2, which may be, for example, a sheet-metal component. The first component 2 may be, for example, a component of a vehicle body (vehicle body component). Alternatively, the first component may also be a plastics component, in particular made of fiber-reinforced plastics material (for example carbon-fiber-reinforced plastics material).

Protruding from the first component 2 is a male fixing element 3, which has a first spherical or sphere-like portion 3a and a second spherical or sphere-like portion 3b adjoining the latter. The two spherical or sphere-like portions 3a, 3b can be formed, for example, by two welded-together metal spheres (known as a "double sphere"). The first spherical or sphere-like portion 3a can be welded to a top side 2a of the first component 2 or be connected to the first component 2 in some other way.

Also marked in FIG. 1 is a normal line 4, which extends through the midpoints of the two spherical or sphere-like portions 3a, 3b and which is perpendicular to the tangential plane of the first component 2 at the point of contact (the midpoint of the contact surface) of the first spherical portion 3a with the first component 2.

Clipped onto the male fixing element 3 or—to be more precise—onto the second spherical or sphere-like portion 3b of the male fixing element 3, is a clip element 5. The clip element 5 has four uniform-size clamping jaws 6a, 6b, 6c, 6d arranged in a distributed manner in the circumferential direction (cf. FIG. 3, 6).

As can be seen best from FIG. 1, the clamping jaws 6a-6d bear against the second portion 3b obliquely from below, i.e. beneath an equatorial plane of the second portion 3b. The (inner) bearing surfaces of the clamping jaws 6a-6d are formed in a spherical or sphere-like concave manner and thus in a complementary manner to the external contour of the second portion 3b, resulting in relatively large bearing surfaces.

Figure 3:
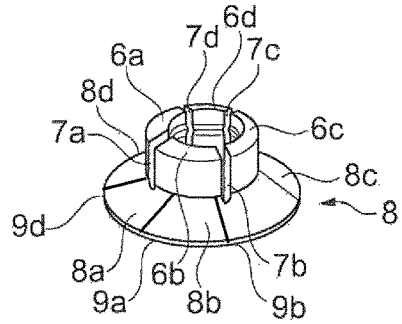
FIG. 3-6 are perspective, cross-sectional, side and top views, respectively, comparing of the clip element shown in FIG. 2.
Figure 6:
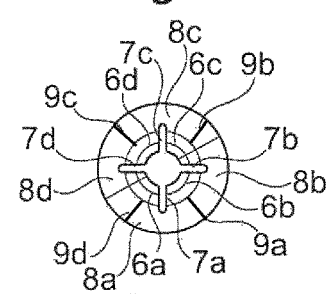

As can be seen for example from FIGS. 3 and 6, the individual clamping jaws 6a, 6b, 6c, 6d are "separated from one another" by clamping-jaw slots 7a, 7b, 7c, 7d which extend downward from a top side of the clamping jaws as far as a shield-ring-like portion 8. This ensures that the clamping jaws 6a, 6b, 6c, 6d can spring radially inward or outward independently of one another.

The shield-ring-like or hat-like portion 8 is formed by shield-ring lobes 8a, 8b, 8c, 8d that protrude obliquely downward from the clamping jaws 6a-6d (cf. FIG. 3, 6). The individual shield-ring lobes 8a-8d are each separated from one another by radially extending shield-ring slots 9a, 9b, 9c, 9d (cf. FIG. 3, 6). The shield-ring lobes 8a-8d can thus likewise execute spring movements independently of one another.

In the left-hand half of the cross section shown in FIG. 1, the clip element 5 has a nose-like portion 10 which extends downward as far as a region of the equatorial plane of the first portion 3a, i.e. as far as a central region of the first portion 3a, and bears against the first portion 3a from the outside. Such a nose-like portion 10 can be provided, but does not absolutely have to be provided. Rather, as illustrated in the right-hand part of the cross section of the clip element shown in FIG. 1, such a nose-like portion can also be dispensed with.

If such a nose-like portion is not provided and, as illustrated in the right-hand part of FIG. 1, a "continuous conical face" is provided, it is easier to "float" the clip element into position during assembly, this being advantageous in particular when the male fixing element is shaped or arranged in an "imprecise" manner.

As can be seen from FIG. 1, 2, a second component 11 is positioned on the first component 2. The second component 11 has a through-hole 11a. The second component 11 can be, for example, a component of a vehicle body (vehicle body component).

The male fixing element 3 extends through the through-hole 11a. The length, measured in the direction of the normal 4, of the male fixing element is measured here such that the second portion 3b of the male fixing element comes to lie fully on that side of the second component 11 that is remote from the first component 2. In the exemplary embodiment shown in FIGS. 1 and 2, the second portion 3b even protrudes to some extent from that side of the second component 11 that is remote from the first component 2, thereby making it possible for the clamping jaws 6a-6d to bear against the external circumference of the second portion 3b obliquely from below and beneath the equatorial plane 7.

Figure 2:
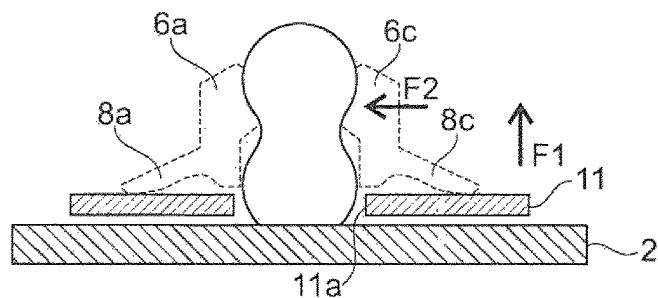
FIG. 2 illustrates the principle of self-locking described by way of one of the two variants shown in FIG. 1.

FIG. 2 shows a state in which a "pull-off force F1" that pulls the second component 11 away from the first component 2 is being exerted on the second component 11. Since the shield-ring lobes 8a-8d bear against that side of the second component 11 that is remote from the first component 2, the pull-off force F1 is transferred to the shield-ring lobes 8a-8d. The pull-off force F1 is converted into pressing forces F2 and into pressing moments which press the clamping jaws 6a-6d against the second portion 3b of the male fixing element 3. The greater the pull-off force F1, the greater the pressing forces and pressing moments, with the result that self-locking occurs. The clamping jaws 6a-6d thus oppose any pulling of the clip element 5 off the male fixing element 3.

Preferably, the clip element 5 is produced from an elastic plastics material. A clip element 5, as is shown in FIG. 1-6, exhibits a joining force (force required to clip onto the male fixing element 3) which is much less than the pull-off force required to pull the clip element 5 off the male fixing element 3. In the case of the design of the clip element 5 shown in FIG. 1-6, the clip element 5 can be pulled off the male fixing element 3 in principle, i.e. without using a special tool, only by destroying the clip element 5.

Figure 4:
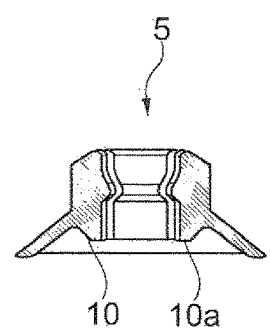
Figure 5:
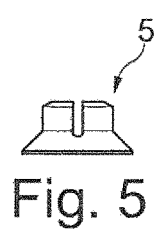

For the sake of completeness, FIGS. 4 and 5 are also mentioned.

FIG. 4 shows a cross section of a clip element 5 having latching noses 10, 10a.

FIG. 5 shows a side view of the clip element 5.

Figure 7:
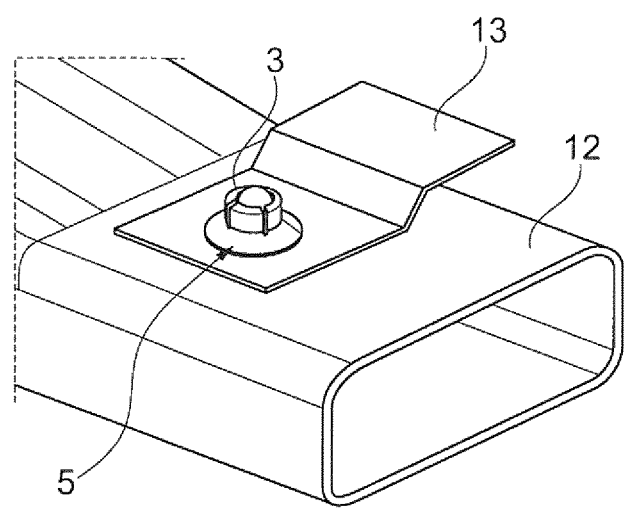
FIG. 7 shows a specific application example of a component connection according to an embodiment of the invention.

FIG. 7 shows a component connection according to an embodiment of the invention. Welded onto a rectangular-tube-like structural element 12 of a vehicle (not shown in more detail here) is a male fixing element 3. Positioned on the male fixing element 3 is a metal bracket 13 which is firmly clipped on the male fixing element 3 by use of a clip element 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clip connection, comprising:
    a first component;
    a male fixing element projecting from the first component, the male fixing element having a first spherical portion connected directly to the first component and a second spherical portion connected to the first portion;
    a clip element that is clipped onto the male fixing element, wherein
    the clip element has a plurality of clamping jaws spaced apart from one another in a circumferential direction of the clip element, and
    the plurality of clamping jaws bear against the spherical portion from below beneath an equatorial plane of the second spherical portion.

2. The clip connection according to claim 1, wherein the clip element further comprises a shield-ring portion projecting from a lower region of the clamping jaws.

3. The clip connection according to claim 2, wherein the clamping jaws are separated from one another by clamping-jaw slots.

4. The clip connection according to claim 3, wherein the clamping-jaw slots extend from a top side of the clamping jaws to the shield-ring portion.

5. The clip connection according to claim 4, wherein:
    the shield-ring portion has shield-ring slots spaced apart from one another in the circumferential direction of the clip element,
    the shield-ring slots extend in a radial direction of the clip element, and
    a respective shield-ring lobe is provided between two adjacent shield-ring slots in the circumferential direction.

6. The clip connection according to claim 5, wherein the shield-ring slots are arranged offset with respect to the clamping-jaw slots viewed in the circumferential direction of the clip element.

7. The clip connection according to claim 6, wherein
    each of the shield-ring lobes extends in each case over half of a first clamping jaw and over half of an adjacent second clamping jaw viewed in the circumferential direction.

8. The clip connection according to claim 5, wherein the clip element has at least three shield-ring slots and shield-ring lobes.

9. The clip connection according to claim 5, wherein the clip element has only four shield-ring slots and shield-ring lobes.

10. The clip connection according to claim 1, wherein the clip element has at least three clamping jaws and clamping-jaw slots.

11. The clip connection according to claim 1, wherein the clip element has only four clamping jaws and clamping-jaw slots.

12. The clip connection according to claim 1, further comprising:
    a second component having a through-hole, wherein
    the male fixing element extends through the through-hole of the second component.

13. The clip connection according to claim 12, wherein:
    at least the shield-ring portion of the clip element bears against the second component on a side remote from the first component in a region near the through-hole, and the shield-ring portion opposes any pulling of the second component off the first component, wherein a pull-off force acting on the second component generates a bending moment in the shield-ring lobes, the bending moment pressing the clamping jaws against the second spherical portion of the male fixing element to provide a self-locking action.

14. The clip connection according to claim 1, wherein:
the first and second spherical portions are welded together.

15. The clip connection according to claim 1, wherein the male fixing element is made of metal.

16. The clip connection according to claim 1, wherein the male fixing element is made of steel.

17. The clip connection according to claim 1, wherein the male fixing element is welded to the first component.

18. The clip connection according to claim 1, wherein the clip element is made of a plastic material.

\* \* \* \* \*